United States Patent [19]

Bains

[11] Patent Number: 4,888,770
[45] Date of Patent: Dec. 19, 1989

[54] ALGORITHM FOR SELECTING CHANNELS FOR MULTIPLEXER FRAME

[75] Inventor: Kuldip S. Bains, Watertown, Conn.
[73] Assignee: General DataComm, Inc., Middlebury, Conn.
[21] Appl. No.: 259,856
[22] Filed: Oct. 19, 1988
[51] Int. Cl.$^4$ ............................................. H04J 3/12
[52] U.S. Cl. .................................. 370/110.1; 379/112
[58] Field of Search ...................... 370/85, 60, 94, 58, 370/110.1; 340/825.5; 379/112, 762

[56] References Cited

U.S. PATENT DOCUMENTS

| | | | |
|---|---|---|---|
| 4,410,765 | 10/1983 | Hestad et al. | 379/112 |
| 4,585,904 | 4/1986 | Mincone et al. | 379/112 |
| 4,607,144 | 8/1986 | Carmen et al. | 379/162 |
| 4,727,536 | 2/1988 | Reeves et al. | 370/84 |

Primary Examiner—Joseph A. Orsino
Assistant Examiner—Frank M. Scutch, III
Attorney, Agent, or Firm—David P. Gordon

[57] ABSTRACT

An algorithm for ordering selects for a plurality of channels to be multiplexed into a frame is provided. A channel ready counter and a channel select position counter for each of the channels to be multiplexed are initialized. The first and succeeding channel selects are chosen based primarily on the respective values of the channel ready counters such that a channel having a ready counter of relative higher value is always selected before a channel having a ready counter of relative lower value. Where channel ready counter integer values of more than one channel are equal, the select is chosen on the secondary basis of channel rate, with the highest rate channel of the highest ready count contributing first. After a select is made, the ready counter of the selected channel is determined, and the position counters of the channels are decremented by a value corresponding to the number of selects for that channel in the frame. If the position counter of a channel reach zero or goes negative as a result of the decrementing, the position counter of that channel is increased by the total number of selects in the frame, and the ready counter for that channel is incremented by one. After such updating, another selection for the frame may be made based on the ready counter values of the channels. The provided algorithm guarantees that no channel will ever have an excursion of more than one bit available for placement in the frame.

11 Claims, 28 Drawing Sheets

FIG. 2a1

Frame Selects as Generated (matrix of digits — 9 rows × 20 columns)

Frame length = 240
Number of channels = 9

| Channel Number | Selects | Ready Ctr Max | Ready Ctr Min |
|---|---|---|---|
| 5 | 78 | 1 | 0 |
| 4 | 45 | 1 | 0 |
| 3 | 23 | 1 | 0 |
| 1 | 23 | 1 | 0 |
| 2 | 23 | 1 | 0 |
| 6 | 12 | 1 | 0 |
| 7 | 12 | 1 | 0 |
| 8 | 12 | 2 | 0 |
| 9 | 12 | 2 | 0 |

| Channel Number | Frame Selects | Position Counter | | | | | | | | |
|---|---|---|---|---|---|---|---|---|---|---|
| 5 | 78 | 240 | 162 | 84 | 6 | 168 | 90 | 12 | 174 | 96 | 18 |
| 4 | 45 | 240 | 195 | 150 | 105 | 60 | 15 | 210 | 165 | 120 | 75 |
| 3 | 23 | 240 | 217 | 194 | 171 | 148 | 125 | 102 | 79 | 56 | 33 |
| 1 | 23 | 240 | 217 | 194 | 171 | 148 | 125 | 102 | 79 | 56 | 33 |
| 2 | 23 | 240 | 217 | 194 | 171 | 148 | 125 | 102 | 79 | 56 | 33 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |
| 5 | 78 | 180 | 102 | 24 | 186 | 108 | 30 | 192 | 114 | 36 | 198 |
| 4 | 45 | 30 | 225 | 180 | 135 | 90 | 45 | 240 | 195 | 150 | 105 |
| 3 | 23 | 10 | 227 | 204 | 181 | 158 | 135 | 112 | 89 | 66 | 43 |
| 1 | 23 | 10 | 227 | 204 | 181 | 158 | 135 | 112 | 89 | 66 | 43 |
| 2 | 23 | 10 | 227 | 204 | 181 | 158 | 135 | 112 | 89 | 66 | 43 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

|   |   |   |   |   |   |   |   |   |   |   |
|---|---|---|---|---|---|---|---|---|---|---|
| 5 | 78 | 120/180 | 42/135 | 204/90 | 126/45 | 48/240 | 210/195 | 132/150 | 54/105 | 216/60 | 138/15 |
| 4 | 45 |  | 37 | 14 | 231 | 208 | 185 | 162 | 139 | 116 | 93 |
| 3 | 23 | 60 | 37 | 14 | 231 | 208 | 185 | 162 | 139 | 116 | 93 |
| 1 | 23 | 60 | 37 | 14 | 231 | 208 | 185 | 162 | 139 | 116 | 93 |
| 2 | 23 | 60 | 228 | 216 | 204 | 192 | 180 | 168 | 156 | 144 | 132 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

|   |   |   |   |   |   |   |   |   |   |   |
|---|---|---|---|---|---|---|---|---|---|---|
| 5 | 78 | 60 | 222 | 144 | 66 | 228 | 150 | 72 | 234 | 156 | 78 |
| 4 | 45 | 210 | 165 | 120 | 75 | 30 | 225 | 180 | 135 | 90 | 45 |
| 3 | 23 |  | 47 | 24 | 1 | 218 | 195 | 172 | 149 | 126 | 103 |
| 1 | 23 | 70 | 47 | 24 | 1 | 218 | 195 | 172 | 149 | 126 | 103 |
| 2 | 23 | 70 | 47 | 24 | 1 | 218 | 195 | 172 | 149 | 126 | 103 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 120 | 75 | 30 | 225 | 180 | 135 | 90 | 45 | 240 | 195 |
| 3 | 23 | 120 | 97 | 74 | 51 | 28 | 5 | 222 | 199 | 176 | 153 |
| 1 | 23 | 120 | 97 | 74 | 51 | 28 | 5 | 222 | 199 | 176 | 153 |
| 2 | 23 | 120 | 97 | 74 | 51 | 28 | 5 | 222 | 199 | 176 | 153 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 180 | 102 | 24 | 186 | 108 | 30 | 192 | 114 | 36 | 198 |
| 4 | 45 | 150 | 105 | 60 | 15 | 210 | 165 | 120 | 75 | 30 | 225 |
| 3 | 23 | 130 | 107 | 84 | 61 | 38 | 15 | 232 | 209 | 186 | 163 |
| 1 | 23 | 130 | 107 | 84 | 61 | 38 | 15 | 232 | 209 | 186 | 163 |
| 2 | 23 | 130 | 107 | 84 | 61 | 38 | 15 | 232 | 209 | 186 | 163 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

FIG. 2h

| | | | | | | | | | | | |
|---|---|---|---|---|---|---|---|---|---|---|---|
| 5 | 78 | 120 | 42 | 204 | 126 | 48 | 210 | 132 | 54 | 216 | 138 |
| 4 | 45 | 180 | 135 | 90 | 45 | 240 | 195 | 150 | 105 | 60 | 15 |
| 3 | 23 | 140 | 117 | 94 | 71 | 48 | 25 | 2 | 219 | 196 | 173 |
| 1 | 23 | 140 | 117 | 94 | 71 | 48 | 25 | 2 | 219 | 196 | 173 |
| 2 | 23 | 140 | 117 | 94 | 71 | 48 | 25 | 2 | 219 | 196 | 173 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 60 | 222 | 144 | 66 | 228 | 150 | 72 | 234 | 156 | 78 |
| 4 | 45 | 210 | 165 | 120 | 75 | 30 | 225 | 180 | 135 | 90 | 45 |
| 3 | 23 | 150 | 127 | 104 | 81 | 58 | 35 | 12 | 229 | 206 | 183 |
| 1 | 23 | 150 | 127 | 104 | 81 | 58 | 35 | 12 | 229 | 206 | 183 |
| 2 | 23 | 150 | 127 | 104 | 81 | 58 | 35 | 12 | 229 | 206 | 183 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 240 | 195 | 150 | 105 | 60 | 15 | 210 | 165 | 120 | 75 |
| 3 | 23 | 160 | 137 | 114 | 91 | 68 | 45 | 22 | 239 | 216 | 193 |
| 1 | 23 | 160 | 137 | 114 | 91 | 68 | 45 | 22 | 239 | 216 | 193 |
| 2 | 23 | 160 | 137 | 114 | 91 | 68 | 45 | 22 | 239 | 216 | 193 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 180 | 102 | 24 | 186 | 108 | 30 | 192 | 114 | 36 | 198 |
| 4 | 45 | 30 | 225 | 180 | 135 | 90 | 45 | 240 | 195 | 150 | 105 |
| 3 | 23 | 170 | 147 | 124 | 101 | 78 | 55 | 32 | 9 | 226 | 203 |
| 1 | 23 | 170 | 147 | 124 | 101 | 78 | 55 | 32 | 9 | 226 | 203 |
| 2 | 23 | 170 | 147 | 124 | 101 | 78 | 55 | 32 | 9 | 226 | 203 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 120 | 42 | 204/90 | 126 | 48 | 210/195 | 132 | 54 | 216/60 | 138 |
| 4 | 45 | 180 | 135 | 174 | 45 | 240/128 | 105 | 150 | 105 | 36 | 15 |
| 3 | 23 | 220 | 197 | 174 | 151 | 128 | 105 | 82 | 59 | 36 | 13 |
| 1 | 23 | 220 | 197 | 174 | 151 | 128 | 105 | 82 | 59 | 36 | 13 |
| 2 | 23 | 240 | 197 | 174 | 151 | 128 | 105 | 82 | 59 | 36 | 13 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 60 | 222 | 144 | 66 | 228/30 | 150 | 72 | 234 | 156 | 78 |
| 4 | 45 | 210 | 165 | 120 | 75 | 138 | 225 | 180 | 135 | 90 | 45 |
| 3 | 23 | 230 | 207 | 184 | 161 | 138 | 115 | 92 | 69 | 46 | 23 |
| 1 | 23 | 230 | 207 | 184 | 161 | 138 | 115 | 92 | 69 | 46 | 23 |
| 2 | 23 | 230 | 207 | 184 | 161 | 138 | 115 | 92 | 69 | 46 | 23 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

FIG. 3b

| Channel Number | Frame Selects | Position Counter | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 240 | 195 | 150 | 105 | 60 | 15 | 210 | 165 | 120 | 75 |
| 3 | 23 | 240 | 217 | 194 | 171 | 148 | 125 | 102 | 79 | 56 | 33 |
| 1 | 23 | 240 | 217 | 194 | 171 | 148 | 125 | 102 | 79 | 56 | 33 |
| 2 | 23 | 240 | 217 | 194 | 171 | 148 | 125 | 102 | 79 | 56 | 33 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |
| 5 | 78 | 180 | 102 | 24 | 186 | 108 | 30 | 192 | 114 | 36 | 198 |
| 4 | 45 | 30 | 225 | 180 | 135 | 90 | 45 | 240 | 195 | 150 | 105 |
| 3 | 23 | 10 | 227 | 204 | 181 | 158 | 135 | 112 | 89 | 66 | 43 |
| 1 | 23 | 10 | 227 | 204 | 181 | 158 | 135 | 112 | 89 | 66 | 43 |
| 2 | 23 | 10 | 227 | 204 | 181 | 158 | 135 | 112 | 89 | 66 | 43 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | |
|---|---|---|---|---|---|---|---|---|---|---|
| 5 | 78 | 120 | 42 | 204 | 126 | 48 | 210 | 132 | 54 | 216 | 138 |
| 4 | 45 | 60 | 15 | 210 | 165 | 120 | 75 | 30 | 225 | 180 | 135 |
| 3 | 23 | 20 | 237 | 214 | 191 | 168 | 145 | 122 | 99 | 76 | 53 |
| 1 | 23 | 20 | 237 | 214 | 191 | 168 | 145 | 122 | 99 | 76 | 53 |
| 2 | 23 | 20 | 237 | 214 | 191 | 168 | 145 | 122 | 99 | 76 | 53 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | |
|---|---|---|---|---|---|---|---|---|---|---|
| 5 | 78 | 60 | 222 | 144 | 66 | 228 | 150 | 72 | 234 | 156 | 78 |
| 4 | 45 | 90 | 45 | 240 | 195 | 150 | 105 | 60 | 15 | 210 | 165 |
| 3 | 23 | 30 | 7 | 224 | 201 | 178 | 155 | 132 | 109 | 86 | 63 |
| 1 | 23 | 30 | 7 | 224 | 201 | 178 | 155 | 132 | 109 | 86 | 63 |
| 2 | 23 | 30 | 7 | 224 | 201 | 178 | 155 | 132 | 109 | 86 | 63 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | | |
|---|---|---|---|---|---|---|---|---|---|---|---|
| 5 | 78 | 120 | 42 | 204 | | | 210 | 132 | 54 | 216 | 138 |
| 4 | 45 | 60 | 15 | 210 | 126 | 48 | 75 | 30 | 225 | 180 | 135 |
| 3 | 23 | 100 | 77 | 54 | 165 | 120 | 225 | 202 | 179 | 156 | 133 |
| 1 | 23 | 100 | 77 | 54 | 31 | 8 | 225 | 202 | 179 | 156 | 133 |
| 2 | 23 | 100 | 77 | 54 | 31 | 8 | 180 | 168 | 156 | 144 | 132 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 60 | 222 | 144 | 66 | 228 | 150 | 72 | 234 | 156 | 78 |
| 4 | 45 | 90 | 45 | 240 | 195 | 150 | 105 | 60 | 15 | 210 | 165 |
| 3 | 23 | 110 | 87 | 64 | 41 | 18 | 235 | 212 | 189 | 166 | 143 |
| 1 | 23 | 110 | 87 | 64 | 41 | 18 | 235 | 212 | 189 | 166 | 143 |
| 2 | 23 | 110 | 87 | 64 | 41 | 18 | 235 | 212 | 189 | 166 | 143 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

FIG. 3h

| | | | | | | | | | | | |
|---|---|---|---|---|---|---|---|---|---|---|---|
| 5 | 78 | 240 | 162 | 84 | 6 | 168 | 90 | 12 | 174 | 96 | 18 |
| 4 | 45 | 120 | 75 | 30 | 225 | 180 | 135 | 90 | 45 | 240 | 195 |
| 3 | 23 | 120 | 97 | 74 | 51 | 28 | 5 | 222 | 199 | 176 | 153 |
| 1 | 23 | 120 | 97 | 74 | 51 | 28 | 5 | 222 | 199 | 176 | 153 |
| 2 | 23 | 120 | 97 | 74 | 51 | 28 | 5 | 222 | 199 | 176 | 153 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | | |
|---|---|---|---|---|---|---|---|---|---|---|---|
| 5 | 78 | 180 | 102 | 24 | 186 | 108 | 30 | 192 | 114 | 36 | 198 |
| 4 | 45 | 150 | 105 | 60 | 15 | 210 | 165 | 120 | 75 | 30 | 225 |
| 3 | 23 | 130 | 107 | 84 | 61 | 38 | 15 | 232 | 209 | 186 | 163 |
| 1 | 23 | 130 | 107 | 84 | 61 | 38 | 15 | 232 | 209 | 186 | 163 |
| 2 | 23 | 130 | 107 | 84 | 61 | 38 | 15 | 232 | 209 | 186 | 163 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

FIG. 3i

| | | | | | | | | | | |
|---|---|---|---|---|---|---|---|---|---|---|
| 5 | 78 | 120 | 42 | 204 | 126 | 48 | 210 | 132 | 54 | 216 | 138 |
| 4 | 45 | 180 | 135 | 90 | 45 | 240 | 195 | 150 | 105 | 60 | 15 |
| 3 | 23 | 140 | 117 | 94 | 71 | 48 | 25 | 2 | 219 | 196 | 173 |
| 1 | 23 | 140 | 117 | 94 | 71 | 48 | 25 | 2 | 219 | 196 | 173 |
| 2 | 23 | 140 | 117 | 94 | 71 | 48 | 25 | 2 | 219 | 196 | 173 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | |
|---|---|---|---|---|---|---|---|---|---|---|
| 5 | 78 | 60 | 222 | 144 | 66 | 228 | 150 | 72 | 234 | 156 | 78 |
| 4 | 45 | 210 | 165 | 120 | 75 | 30 | 225 | 180 | 135 | 90 | 45 |
| 3 | 23 | 150 | 127 | 104 | 81 | 58 | 35 | 12 | 229 | 206 | 183 |
| 1 | 23 | 150 | 127 | 104 | 81 | 58 | 35 | 12 | 229 | 206 | 183 |
| 2 | 23 | 150 | 127 | 104 | 81 | 58 | 35 | 12 | 229 | 206 | 183 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

| | | | | | | | | | | |
|---|---|---|---|---|---|---|---|---|---|---|
| 5 | 78 | 240 | 162 | 84 | 6 | 168 | 90 | 12 | 174 | 96 | 18 |
| 4 | 45 | 120 | 75 | 30 | 225 | 180 | 135 | 90 | 45 | 240 | 195 |
| 3 | 23 | 200 | 177 | 154 | 131 | 108 | 85 | 62 | 39 | 16 | 233 |
| 1 | 23 | 200 | 177 | 154 | 131 | 108 | 85 | 62 | 39 | 16 | 233 |
| 2 | 23 | 200 | 177 | 154 | 131 | 108 | 85 | 62 | 39 | 16 | 233 |
| 6 | 12 | 240 | 228 | 216 | 204 | 192 | 180 | 168 | 156 | 144 | 132 |
| 7 | 12 | 240 | 228 | 216 | 204 | 192 | 180 | 168 | 156 | 144 | 132 |
| 8 | 12 | 240 | 228 | 216 | 204 | 192 | 180 | 168 | 156 | 144 | 132 |
| 9 | 12 | 240 | 228 | 216 | 204 | 192 | 180 | 168 | 156 | 144 | 132 |

| | | | | | | | | | | |
|---|---|---|---|---|---|---|---|---|---|---|
| 5 | 78 | 180 | 102 | 24 | 186 | 108 | 30 | 192 | 114 | 36 | 198 |
| 4 | 45 | 150 | 105 | 60 | 15 | 210 | 165 | 120 | 75 | 30 | 225 |
| 3 | 23 | 210 | 187 | 164 | 141 | 118 | 95 | 72 | 49 | 26 | 3 |
| 1 | 23 | 210 | 187 | 164 | 141 | 118 | 95 | 72 | 49 | 26 | 3 |
| 2 | 23 | 210 | 187 | 164 | 141 | 118 | 95 | 72 | 49 | 26 | 3 |
| 6 | 12 | 120 | 108 | 96 | 84 | 72 | 60 | 48 | 36 | 24 | 12 |
| 7 | 12 | 120 | 108 | 96 | 84 | 72 | 60 | 48 | 36 | 24 | 12 |
| 8 | 12 | 120 | 108 | 96 | 84 | 72 | 60 | 48 | 36 | 24 | 12 |
| 9 | 12 | 120 | 108 | 96 | 84 | 72 | 60 | 48 | 36 | 24 | 12 |

ALGORITHM FOR SELECTING CHANNELS FOR MULTIPLEXER FRAME

BACKGROUND

This application is related to concurrently filed application Ser. No. 07/259,803 entitled "Framing Algorithm for Bit Interleaved Time Division Multiplexer", which is hereby incorporated by reference herein and which is assigned to the assignee herein. This application is also related to concurrently filed application Ser. No. 07/259,855 entitled "Algorithm for Minimizing Excursion in Placement of Channel Selects into Multiplexer Frame", which is assigned to the assignee herein.

The present invention relates to time-division-multiplexed (TDM) telecommunication systems. More particularly, the invention relates to methods for inserting channel selects into a frame wherein the excursions of the channels are limited.

In multiplexing information from various channels of varying speeds, it is necessary to buffer information from each channel as the receiver of the multiplexer can only attend to one channel at a time. Each channel typically has its own buffer, and the input by the channel into the buffer relative to the output of the buffer to the receiver is typically asynchronous. It is clearly important that the buffers do not become empty of full at any instant as the empty or full condition would indicate duplication or loss of data respectively.

As indicated in Ser. No. 07/259,803, a framing algorithm may be utilized to set the frame length as well as the number of selects from each channel into the frame. It is then necessary to create a time sequence table with entries which define the order in which the receiver responds to the channels. Each entry in the table represents one bit (or in byte systems - one byte) time of the receiver. Each "channel" must have at least one entry in the frame (even if the entry represents a subsidiary frame such as a secondary or tertiary frame), and the frame is repeated at a rate which is the greatest common divisor of the channels. In general, some channels have a large number of entries in the table while other channels may have only a few or even a single entry. It is then desirable to space the entries for each channel such that they are an equal distance apart; i.e. to minimize the accumulated deviation (excursion) from the ideal space for the channel selects in the frame.

Two methods for limiting excursion are known in the art. A first method, the "priority method" is to order the channels according to their speed and to start with the fastest channel and place the fastest channel selects as closely as possible to their ideal position. Then, the procedure is repeated for the next highest channel. If the ideal select slot is taken by the previous channel, then the nearest vacant slot is sought. The procedure continues until all of the channel selects are placed in the frame. The obvious disadvantage of the "priority method" scheme is that the slower channels are often moved relatively far away from their ideal slots. A further disadvantage is that considerable iterative effort is required to find and fill vacant slots.

A second method for limiting excursion is described in detail in commonly owned U.S. Pat. No. 4,727,536. In that patent, a real time allocation process is described where the channels are arranged in descending order of channel rates and starting with the fastest channel, the channels are scanned to determine whether they are ready to contribute a bit to the aggregate. Initially, all the channels are considered ready to contribute. After its first contribution to the frame, the readiness of a channel is determined by the position of a counter associated with the channel. The counter is initially set equal to the frame length. Then, each time a bit is inserted into the frame from the highest rate channel which is ready, the position counter of each channel is adjusted by subtracting the number of selects for that channel from the count, and the position counter of the contributing channel is adjusted by adding the frame length value to the counter value. When the position counter reaches zero or goes negative, the channel is marked to be ready to contribute. The procedure of choosing the fastest channel which is ready to contribute continues until the frame is complete such that all the channels have contributed their proportional number of bits.

Although the method of U.S. Pat. No. 4,727,536 is non-iterative and hence efficient, it has some drawbacks in terms of excursion. Unwanted excursion occurs because the method priortises the channels and tends to be more responsive to the faster channels. In the case of a large number of channels, the non-iterative method can introduce significant excursion to low order channels.

SUMMARY OF THE INVENTION

It is therefore an object of the invention to provide a non-iterative framing algorithm which limits channel excursion.

It is a further object of the invention to provide a real-time non-iterative framing algorithm which assigns integer cost functions to channels and which reduces cost.

In accord with the objects of the invention, an algorithm for ordering selects for a plurality of channels into a frame is provided. The algorithm requires the initializing of a channel ready counter and a channel select position counter in each of the channels to be multiplexed. The first and succeeding channel selects are chosen based at least on the respective values of the channel ready counters such that a channel having a ready counter of relative higher value is always selected before a channel having a ready counter of relative lower value. After a select is made, the ready counter of the selected channel is decremented, and the position counters of the channels are decremented by a value corresponding to the number of selects for that channel in the frame. If the position counter of a channel reaches zero or goes negative as a result of the decrementing, the position counter of that channel is increased by the total number of selects in the frame, and the ready counter for that channel is incremented by one. After such updating, another selection for the frame may be made based on the ready counter values of the channels.

Because many of the channel ready counters will often have identical values, the channels are also preferably ordered by rate (i.e. equivalently by the number of selects of the channel in the frame). In choosing among these channels having ready counters of equal values, a select is made of the channel having the highest rate. However, even if the selection was made arbitrarily (e.g. by channel number), the provided algorithm guarantees that no channel will ever have an excursion of more than one bit available for placement in the frame. The advantage of such a guarantee is the knowledge that in operation, a multiplexer will not cause an overflow of a channel buffer due to a large excursion. In fact, low excursion permits the reduction in the size of the channel buffers.

Other objects and advantages of the invention will become evident upon reference to the detailed description in conjunction with the provided figures.

BRIEF DESCRIPTION OF THE DRAWINGS

FIG. 2a1 is a chart of frame selects generated by the preferred method invention;

FIG. 2a2 is a chart of channel parameters of the hypothetical channels from which the selects are generated;

FIGS. 2b–2m are charts of the computations performed in generating a hypothetical frame according to the preferred method invention.

FIG. 3a1 is a chart of frame selects generated according to a prior art technique;

FIG. 3a2 is a chart of channel parameters of the hypothetical channels from which selects are generated; and FIGS. 3b–3m are charts of the computations performed in generating a hypothetical frame according to a prior art technique.

DETAILED DESCRIPTION OF THE PREFERRED EMBODIMENT

Figure 1:
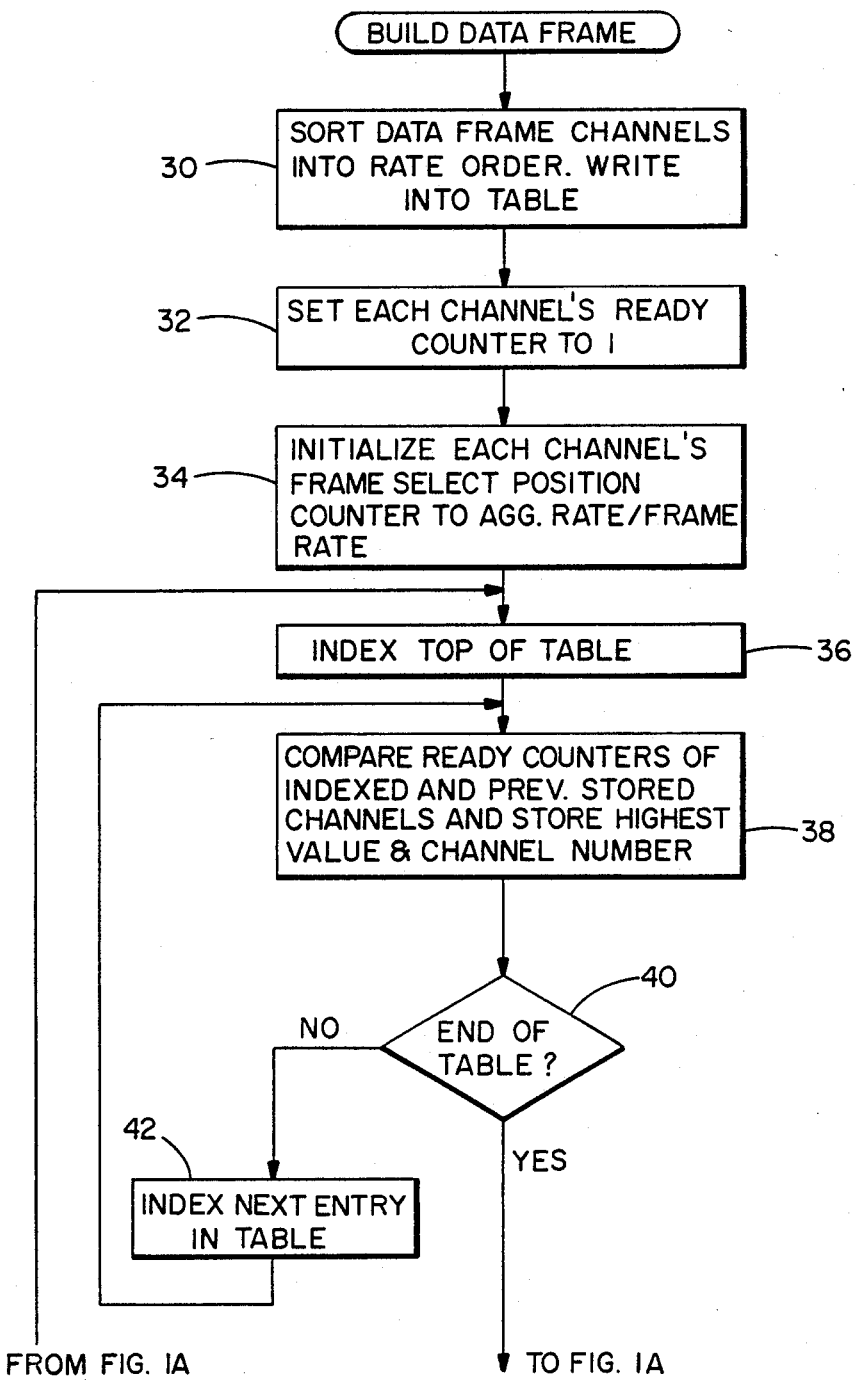
FIG. 1 (including FIG. 1A) is a flow chart illustrating the select determination method of the invention.
Figure 1A:
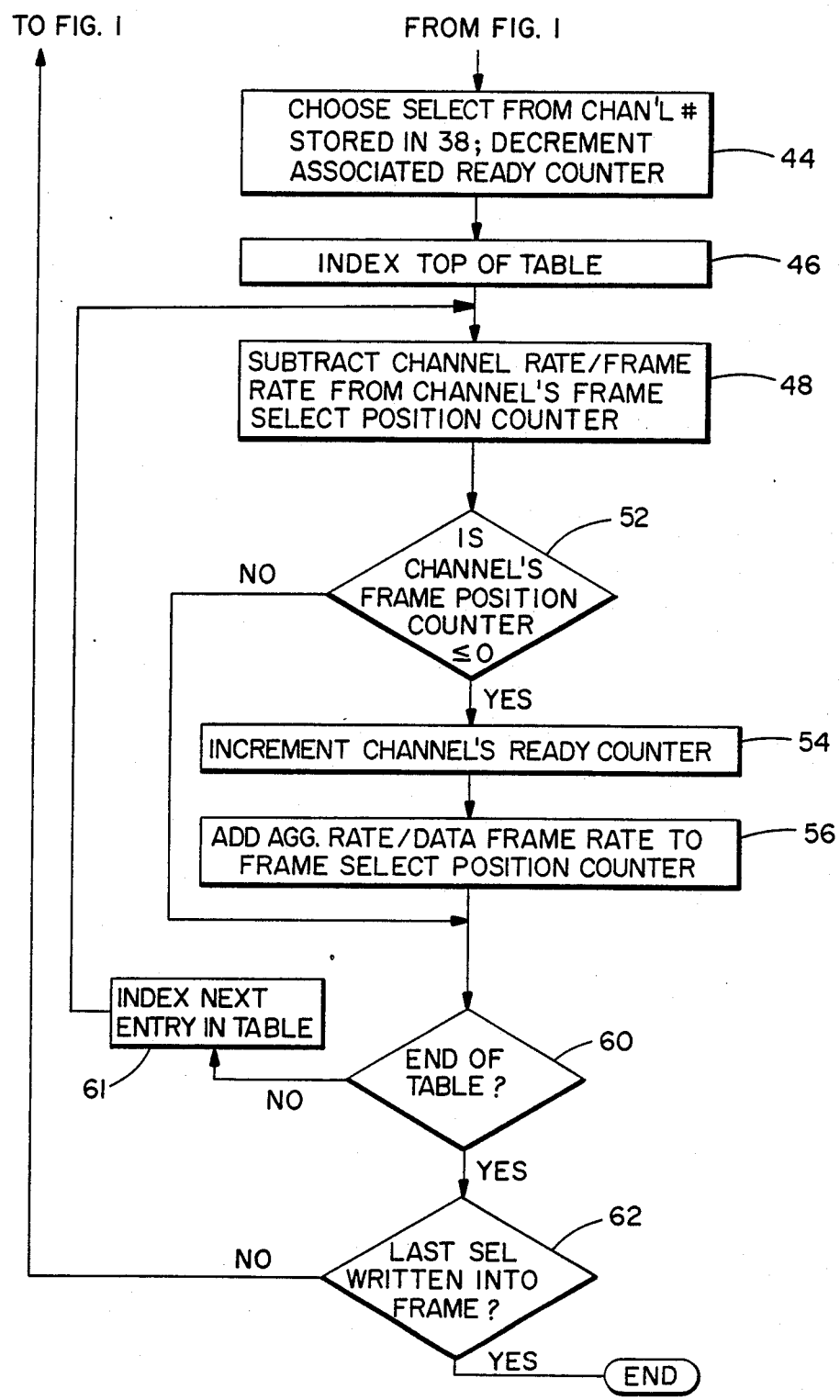
Figures 2A1, 2A2:
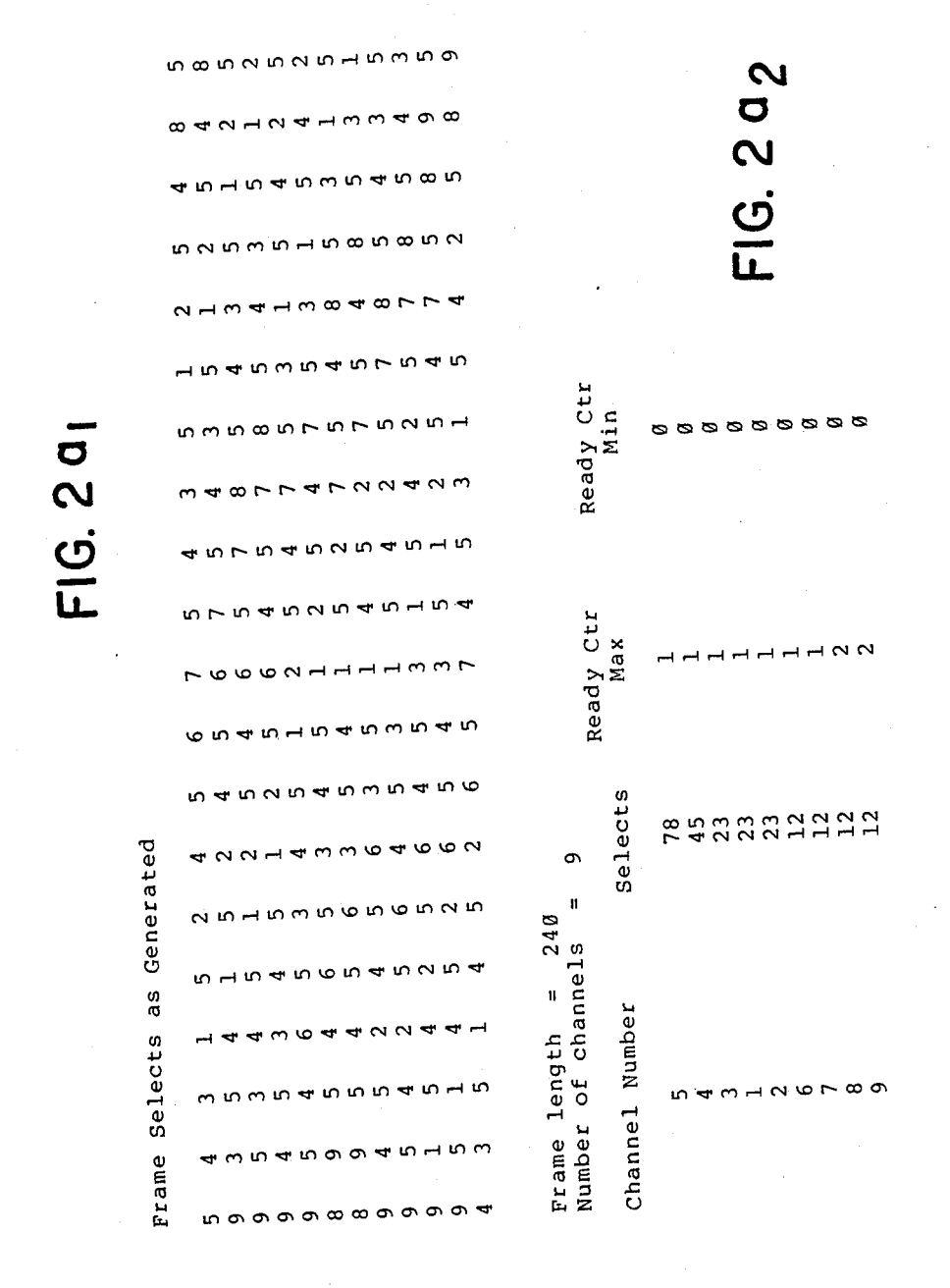

Turning to FIGS. 1 and 1A, a flow chart of the method of generating selects for a frame is provided. In the preferred embodiment, at 30 the channels are ordered by rate order (as seen in FIG. 2a1), and a table is generated preferably including as fields: channel number; channel rate (or number of selects per frame); select position counter; and ready counter (as seen in FIG. 2a2). The ready counter of each channel is initialized to a value of one at 32. The frame select position counter of each channel is then initialized at 34 to be equal to the aggregate rate divided by the frame rate. In other words, the position counters of the channels are set to a value equal to the total number of selects in the frame. With the ready counters set and the select position counters initialized, at 36, the first channel (i.e. the data channel with the highest rate) is indexed. At 38, the value of the ready counter of the indexed channel is read and compared to the value of the ready counters of previously indexed channels. If the value of the ready counter of the indexed channel is greater than the previously stored value, the ready counter value of the indexed channel is stored along with an indication of its corresponding channel. Otherwise, the method continues at 40 with a determination of whether all channels have been scanned. If all channels have not been scanned, the next channel entry is indexed at 42 and another ready counter value comparison is made at 38. The loop is continued until all channels have been scanned. Then, at 44 a select is chosen from the channel having a ready counter having the greatest value (i.e. the greatest cost in terms of excursion), and the ready counter value of the selected channel is decremented. Where a plurality of channels all have ready counters equaling the greatest value, a select is made of the channel having the highest rate. While such a constraint is not necessary to follow the invention, the result naturally follows from the preferred embodiment of steps 36 and 38 where the channels are rate ordered and where the ready counter value of a slower channel is not stored unless its value exceeds that of the previously scanned ready counters.

Once a select has been made at 44, the frame select position counters and ready counters of the channels must all be updated. Thus, starting with the highest rate channel addressed at 46, and in a loop to be described hereinafter, the parameters of each succeeding channel are updated. At 48, a value equal to the number of selects of the particular channel in the frame (which is equal to the channel rate divided by the frame rate), is subtracted from the frame select position counter of the particular channel. At 52 a determination is made as to whether the frame position counter is positive. If the frame position counter is positive, the program continues at step 58, where the next channel is indexed. However, if the position counter has gone to zero or negative, the ready counter of the channel is incremented at 54, and a value equal to the number of selects in the frame is added to the frame select position counter at 56. A determination is made at 60 whether all channels have been updated. If not, the next channel is indexed at 61 and the program returns to step 48 for the current channel being updated. If all channels have been updated, a determination is made at 62 as to whether the frame has been completed. If so, the program ends. If not, the program continues at step 36 where the highest rate channel is indexed to start a determination of the next select for the frame.

Turning to FIGS. 2a1 and 2a2, a hypothetical frame built according to the teachings of the invention is seen. Nine channels are provided and are to be multiplexed into a frame having a total of two hundred and forty selects. As indicated, channel five is the highest rate channel and is to be selected seventy-eight times every frame, while channel four is to be selected forty-five times. Channels three, one, and two are of equal rates and are to be selected twenty-three times each, while channels six through nine are to be selected twelve times each.

Using the excursion algorithm of FIG. 1, selects are chosen for placement into a frame depending upon the ready counter of the channel (i.e. the integer "cost" of the channel in terms of excursion), and secondarily upon the channel rate. In FIGS. 2b–2m (as well as FIGS. 3b–3m), the status of a ready counter set to one is indicated by an underline of the frame select position counter value. No underline indicates that the ready counter is at zero (i.e. the channel will not be ready to contribute information), while a double or triple underline is indicative that the ready counter value is two or three and is ready to contribute two or three bits respectively. The pattern of generated selects is seen in FIG. 2A. Visually, the generation of the selects may be seen by locating at each select position which channel has an underlined position counter value at that position but no underline at the next position (or double underlined at the select position and single underlined at the next position). Of course, the exception to this rule is where a select is made of a channel, and immediately following the select the ready counter of that channel is increased due to the position counter having gone to zero.

Starting at the top of FIG. 2b, and following the first ten selects horizontally, the method outlined in FIG. 1 provides selects of the following channels in the following order: 5, 4, 3, 1, 5, 2, 4, 5, 6, 7. Continuing through the next ten selects, it will be seen that channel nine is not selected, as at the twentieth select, the ready counter of channel five is again one, and a select is chosen from the faster channel five rather than from the slower channel nine. As a result, after the twentieth select, the ready counter of channel nine is increased to a value of two. Because channel nine has the highest ready counter value at the twenty-first select position, a select is taken from channel nine rather than from channels six, seven, or eight. Similarly, after the fortieth select (taken from channel eight), the ready counter of channel nine increases to a value of two. Again, at the forty-first select, a select is taken from chananel nine, even though channel five which has a much greater rate is available to be chosen.

Scanning through FIGS. 2b–2m, it can be seen that the ready counter of any channel is limited to at most two (i.e. one bit excursion) as the provided technique successfully limits excursion. In fact, only channels eight and nine ever reach the one bit excursion, with both of them having two bits ready at selects one hundred-one and one hundred twenty-one (See FIGS. 2g and 2h), and channel nine also having two bits ready at selects twenty-one, (See FIG. 2c) forty-one (See FIG. 2d), sixty-one (see FIG. 2e, eighty-one (See FIG. 2f), one hundred-two (see FIG. 2g), one hundred twenty-two (See FIG. 2h), one hundred forty-one (See FIG. 2i), one hundred sixty-one (See FIG. 2j), one hundred eighty-one (See FIG. 2k), and two hundred-one (See FIG. 2l).

Turning to FIGS. 3b–3m, the status of the ready counters for the same nine channels used in FIGS. 2 (compare FIGS. 2a2 and 3a2) is shown where the framing method of U.S. Pat. No. 4,727,536 is utilized. As indicated, only channel nine ever has a ready counter which exceeds a value of one. However, the ready counter of channel nine indicates a one bit excursion from selects twenty-one through forty (See FIG. 3c), forty-one through fifty-three (See FIG. 3d), sixty-one through seventy-four (See FIG. 3e), and eighty-one through one hundred (See FIG. 3f), a two bit excursion from selects one hundred-one through one hundred fourteen, a one bit excursion from selects one hundred fifteen through one hundred twenty (See FIG. 3g), a two bit excursion from selects one hundred twenty-one through one hundred thirty-three, a one bit excursion from selects one hundred thirty-four through one hundred thirty-six (See FIG. 3h), one hundred forty-one through one hundred fifty-seven (See FIG. 3i), one hundred sixty-one through hundred seventy-five (See FIG. 3j), one hundred eighty-one through one hundred ninety-seven (See FIG. 3k), and two hundred-one through two hundred eighteen (See FIG. 3l).

In comparing the selects of the instant invention as shown in FIGS. 2b–2m to the selects of the art as shown in FIGS. 3b–3m, it becomes clear that the provided method of the instant invention limits the excursion seen by the channels. Indeed, where many more channels are to be multiplexed with larger frames, it is not uncommon in the art to have excursions of four, five, or even more bits. However, with the instant invention, the channel excursions never exceed more than one bit. This is so, because by structuring the algorithm to select the channel having the greatest integer cost, with the ready counter providing the integer cost, the excursion is limited.

There has been described and illustrated herein a method for choosing channel selects for a frame of a multiplexer. While particular embodiments of the invention have been described, it is not intended that the invention be limited thereby, as it is intended that the invention be broad in scope and that the specifications be read likewise. Thus, while the preferred invention was described with channel ready counters which are incremented as the excursion increases, and channel select position counters which are decremented after each frame select and incremented by frame length upon their values reaching zero, those skilled in the art will appreciate that the ready counters could be arranged to decrement when excursion increases. Similarly, the position counters can be incremented after each select and decremented after reaching a threshold relating to the number of selects in the frame. What is critical is that the position counters be updated after each select in a manner relating to their relative channel rates, and that the ready counters be updated in a consistent fashon to indicate the magnitude of readiness of the channel. Further, while the invention was described in terms of bit multiplexing, those skilled in the art will appreciate that the provided algorithm is appropriate to byte multiplexing. In fact, the advantage of the invention is greater where bytes are multiplexed due to the relatively larger buffer size for bytes as opposed to bits. Finally, those skilled in the art should appreciate that the terminology used in describing the invention (e.g. "channels", "selects", "counters", "frame", etc.) is intended to be broad and non-limiting so as to encompass what is readily understood by those skilled in the art. Therefore, it will be apparent to those skilled in the art that other changes and modifications may be made to the invention as described in the specificaion without departing from the spirit and scope of the invention as so claimed.

I claim:

1. A method for ordering selects for a plurality of channels into a multiplexer frame, comprising:
   (a) providing a channel ready counter and a channel select position counter for each of said plurality of channels;
   (b) initializing said channel ready counters;
   (c) initializing said channel select position counters to a value corresponding to the total number of selects in said frame;
   (d) choosing a select of a channel at least based on respective values of the channel ready counters of said channels, wherein a channel having a ready counter value indicative of relative greater excursion is always chosen over a channel having a ready counter value indicative of relative lesser excursion;
   (e) changing the position counter of each channel by a value corresponding to the number of selects in said frame for that channel;
   (f) changing the position counter of a channel by said value corresponding to the total number of selects in said frame when said position counter for that channel reaches or passes through a predetermined value threshold;
   (g) changing the value of said channel ready counter to indicate greater excursion when said channel position counter for that channel reaches or passes through said predetermined value threshold;
   (h) changing the value of the channel ready counter to indicate less excursion of said channel selected at step (d); and
   (i) repeating steps (d)–(h) until said frame is substantially filled with selects.

2. A method according to claim 1, wherein:

said changing the position counters of step (e) comprises decrementing the position counters, and
said changing the position counters of step (f) comprises incrementing the position counters, 3. A method according to claim 2, wherein:
said position counters are initialized to a value equal to the number of selects in said frame,
said position counters are decremented by a value equaling the number of selects in said frame for that channel, and
said predetermined value threshold is zero.

4. A method according to claim 1, wherein:
said changing the value of channel ready counters of step (g) comprises incrementing the ready counters, and
said changing the value of the channel ready counters of step (h) comprises decrementing the ready counters.

5. A method according to claim 4, wherein:
said channel ready counters are initialized to a value of one, and
said incrementing and decrementing said channel ready counters is incrementing and decrementing by a value of one.

6. A method according to claim 3, wherein:
said changing the value of channel ready counters of step (g) comprises incrementing the ready counters, and
said changing the value of the channel ready counters of step (h) comprises decrementing the ready counters.

7. A method according to claim 6, wherein:
said channel ready counters are initialized to a value of one, and
said incrementing and decrementing said channel ready counters is incrementing and decrementing by a value of one.

8. A method according to claim 1, further comprising:
ordering said channels by channel rate, wherein
said choosing a select of a channel of step (d) is further based on said channel rate, such that where said channel ready counters of a plurality of channels have identical values indicative of greatest excursion, a select is chosen from the channel among those plurality having the highest rate.

9. A method according to claim 3, further comprising:
ordering said channels by channel rate, wherein
said choosing a select of a channel of step (d) is further based on said channel rate, such that where said channel ready counters of a plurality of channels have identical values indicative of greatest excursion, a select is chosen from the channel among those plurality having the highest rate.

10. A method according to claim 5, further comprising:
ordering said channels by channel rate, wherein
said choosing a select of a channel of step (d) is further based on said channel rate, such that where said channel ready counters of a plurality of channels have identical greatest values, a select is chosen from the channel among those plurality having the highest rate.

11. A method according to claim 7, further comprising:
ordering said channels by channel rate, wherein
said choosing a select of a channel of step (d) is further based on said channel rate, such that where said channel ready counters of a plurality of channels have identical greatest values, a select is chosen from the channel among those plurality having the highest rate.

* * * * *